(12) United States Patent
Alberkrack

(10) Patent No.: US 7,030,584 B1
(45) Date of Patent: Apr. 18, 2006

(54) CONTROLLER ARRANGEMENT

(75) Inventor: Jade H. Alberkrack, Tempe, AZ (US)

(73) Assignee: Andigilog, Inc., Tempe, AZ (US)

( * ) Notice: Subject to any disclaimer, the term of this patent is extended or adjusted under 35 U.S.C. 154(b) by 0 days.

(21) Appl. No.: 10/985,754

(22) Filed: Nov. 10, 2004

Related U.S. Application Data

(60) Provisional application No. 60/613,737, filed on Sep. 27, 2004.

(51) Int. Cl.
    *H01R 39/46* (2006.01)
    *H02K 13/00* (2006.01)
    *H02P 7/50* (2006.01)

(52) U.S. Cl. .............. 318/439; 318/135; 318/432; 318/599; 318/685; 318/811; 327/172; 327/175; 363/41

(58) Field of Classification Search .......... 318/599, 318/811, 135, 432, 439, 685; 327/172, 175; 363/41
See application file for complete search history.

(56) References Cited

U.S. PATENT DOCUMENTS

| | | | | |
|---|---|---|---|---|
| 5,361,025 A | * | 11/1994 | De Filippis et al. | ........ 318/599 |
| 5,828,200 A | * | 10/1998 | Ligman et al. | ............. 318/807 |
| 6,812,669 B1 | * | 11/2004 | Hagen | ........................ 318/629 |

* cited by examiner

Primary Examiner—David Martin
Assistant Examiner—Erick Glass
(74) Attorney, Agent, or Firm—Donald J. Lenkszus

(57) ABSTRACT

A control circuit is described in which a single input terminal receives digital control signals and analog control signals. A circuit coupled to the single input provides a first output to indicate that a signal at said single input terminal is a digital signal and a second output indicates that a signal at said single input terminal is an analog signal.

27 Claims, 4 Drawing Sheets

CONTROLLER ARRANGEMENT

RELATED APPLICATIONS

This application claims priority of U.S. Provisional Patent Application Ser. No. 60/613,737 filed Sep. 27, 2004.

FIELD OF THE INVENTION

The invention pertains to a circuit arrangement that is responsive to analog and digital signals received at a common terminal, in general, and to a control arrangement for a brushless direct current motor, in particular.

SUMMARY OF THE INVENTION

A control circuit is described in which a single input terminal receives digital control signals and analog control signals. A circuit coupled to the single input provides a first output to indicate that a signal at said single input terminal is a digital signal and a second output indicates that a signal at said single input terminal is an analog signal.

In accordance with the principles of the invention, a monolithic brushless DC motor controller is provided that contains all of the required functions for implementing fan speed control. The motor controller contains a pulse width modulator (PWM) consisting of a fixed frequency oscillator, comparator and a latch for speed control, commutation logic for proper drive sequencing, on-chip power MOSFETs for direct motor drive, cycle-by-cycle current limiting, programmable fault timer with time delayed restart, and a power down low current mode.

In accordance with one aspect of the invention a control circuit has a single input terminal for receiving digital signals and analog control signals. The digital signals being in a first digital state when below a first level, and being in a second digital state when above a second level. The analog signals are within a range that is greater than said first level and less than said second level. The control circuit includes a comparator circuit coupled to the single input terminal for providing a first output when the level at the single input terminal is below said first level or when the level at the single input terminal is above the second level. The comparator circuit provides a second output when the level at the single input terminal is between the first level and the second level. The first output indicates that a signal at the single input terminal is a digital signal and the second output indicates that a signal at the single input terminal is an analog signal.

In accordance with one aspect of the invention the comparator circuit comprises a first comparator operable to determine if the level at the single input terminal is below the first level and a second comparator operable to determine if the level at the single input terminal is above the second level.

A logic element coupled to the first comparator and to the second comparator provides an output indicative of whether the signal at the single input terminal is a digital signal or an analog signal.

In a method of operating a control circuit in accordance with the invention, signals are received at a single input terminal that may be digital signals and analog control signals. The method includes the steps of determining whether the level of a signal at the single input terminal is below a first level and determining whether the level of the signal at the single input terminal is above the second level. Steps of providing a first output if the level is below the first level or if the level is above the second level; and providing a second output if the level is between the first level and the second level; whereby the first output indicates that a signal at the single input terminal is a digital signal and the second output indicates that a signal at the single input terminal is an analog signal.

A control circuit in accordance with the principles of the invention has a single input terminal for receiving digital signals and analog control signals. The digital signals are in a first digital state when below a first level, and are in a second digital state when above a second level. The analog signals are within a range that is greater than the first level and less than the second level. A comparator circuit coupled to the single input terminal provides a first output when the level at the single input terminal is below the first level or when the level at the single input terminal is above the second level. The comparator circuit provides a second output when the level at the single input terminal is between the first level and the second level. An oscillator provides a pulse waveform at a first output and a saw tooth waveform at a second output. A pulse width modulated comparator has a first input coupled to the single input terminal and a second input coupled to the oscillator second output and has an output. A circuit is coupled to the comparator, the oscillator first output and to the pulse width modulated comparator output. The circuit is operable to generate pulse width modulated control signals in response to digital input signals at the single input terminal and in response to analog input signals at the single input terminal.

In accordance with the principles of the invention the comparator circuit comprises a first comparator operable to determine if the level at the single input terminal is below the first level; and a second comparator operable to determine if the level at the single input terminal is above the second level.

In the illustrative embodiment of the invention a logic element is coupled to the first comparator and to the second comparator to provide an output indicative of whether the signal at the single input terminal is a digital signal or an analog signal.

Still further in accordance, with the principles of the invention, a method of providing control signals, comprises: providing a single input terminal and receiving digital signals at the input terminal. The digital signals are in a first digital state when below a first level, and are in a second digital state when above a second level. The method includes receiving analog signals at the input terminal. The analog signals are within a range that is greater than the first level and less than the second level. The method includes comparing signal levels at the input terminal to the first and the second levels; providing a first output when the level at the input terminal is below the first level or when the level at the input terminal is above the second level; providing a second output when the level at the input terminal is between the first level and the second level; and generating pulse width modulated control signals in response to digital input signals at the single input terminal and in response to analog input signals at the single input terminal.

In the illustrative embodiment of the invention, the method includes providing an oscillator. The oscillator provides a pulse waveform at a first output and as saw tooth waveform at a second output. The method further includes providing a pulse width modulated comparator having a first input coupled to the single input terminal and a second input coupled to the oscillator second output and having an output; and providing a circuit coupled to the comparator, said oscillator first output and to said pulse width modulated comparator output to generate said pulse width modulated control signals when an analog signal is at said single input terminal.

In the illustrative embodiment of the invention the method includes providing a latch operable in conjunction with the oscillator and said pulse width comparator to generate the pulse width modulated control signals.

A motor controller for a brushless direct current motor in accordance with the principles of the invention includes an input terminal for receiving an analog control signal and a digital control signal; and a control circuit coupled to the single input terminal. The control circuit is responsive to digital input signals and analog input signals at the single input terminal to provide pulse width modulated control signals. A motor drive circuit is controlled by the control circuit and is coupleable to a brushless direct current motor for energizing the motor.

In accordance with the principles of the invention the motor controller is formed on a single integrated circuit.

In the illustrative embodiment of the invention the motor drive circuit comprises MOSFETs.

In accordance with yet another aspect of the invention a current comparator is coupled to the motor drive circuit for effecting pulse width modulation control signals on a cycle-by-cycle basis.

BRIEF DESCRIPTION OF THE DRAWING

The invention will be better understood from a reading of the following detailed description of the drawing in which like reference designators are used to identify like elements in the various drawing figures, and in which.

DETAILED DESCRIPTION

Figure 1:
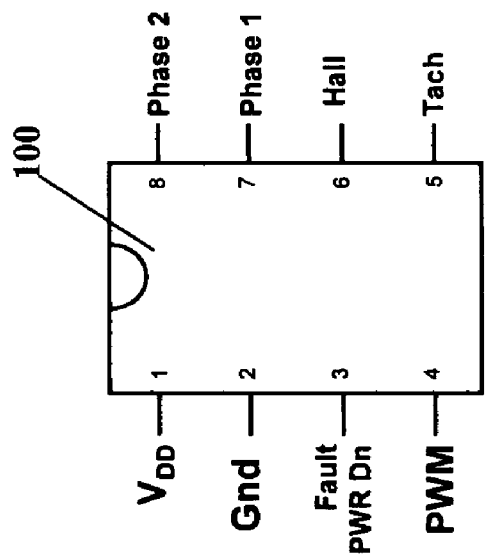
FIG. 1 is a representation of a device in accordance with the principles of the invention.

The illustrative embodiment of the invention is a monolithic brushless DC motor controller 100 that provides functions for implementing fan speed control. As shown in FIG. 1, the invention may be implemented in one configuration as an eight pin package.

Controller 100 may be provided in SOP-8 and MSOP-8 surface mount packages. In other embodiments of the invention controller 100 may be integrated onto the same silicon as the device being cooled by fan 200.

Figure 2:
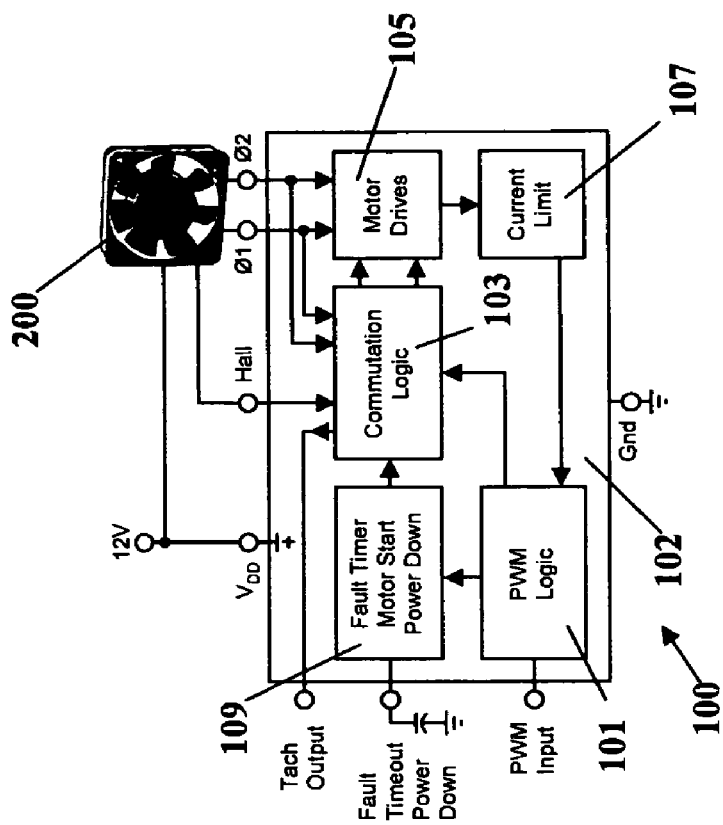
FIG. 2 illustrates the device of FIG. 1 connected to a cooling fan.

Turning now to FIG. 2, controller 100 for speed control of motor 200 includes a pulse width modulator logic or PWM circuit 101, commutation logic for proper drive sequencing 103, direct motor drive 105, current limiter 107, and a programmable fault timer with time delayed restart and a power down low current mode block 109.

Figure 3:
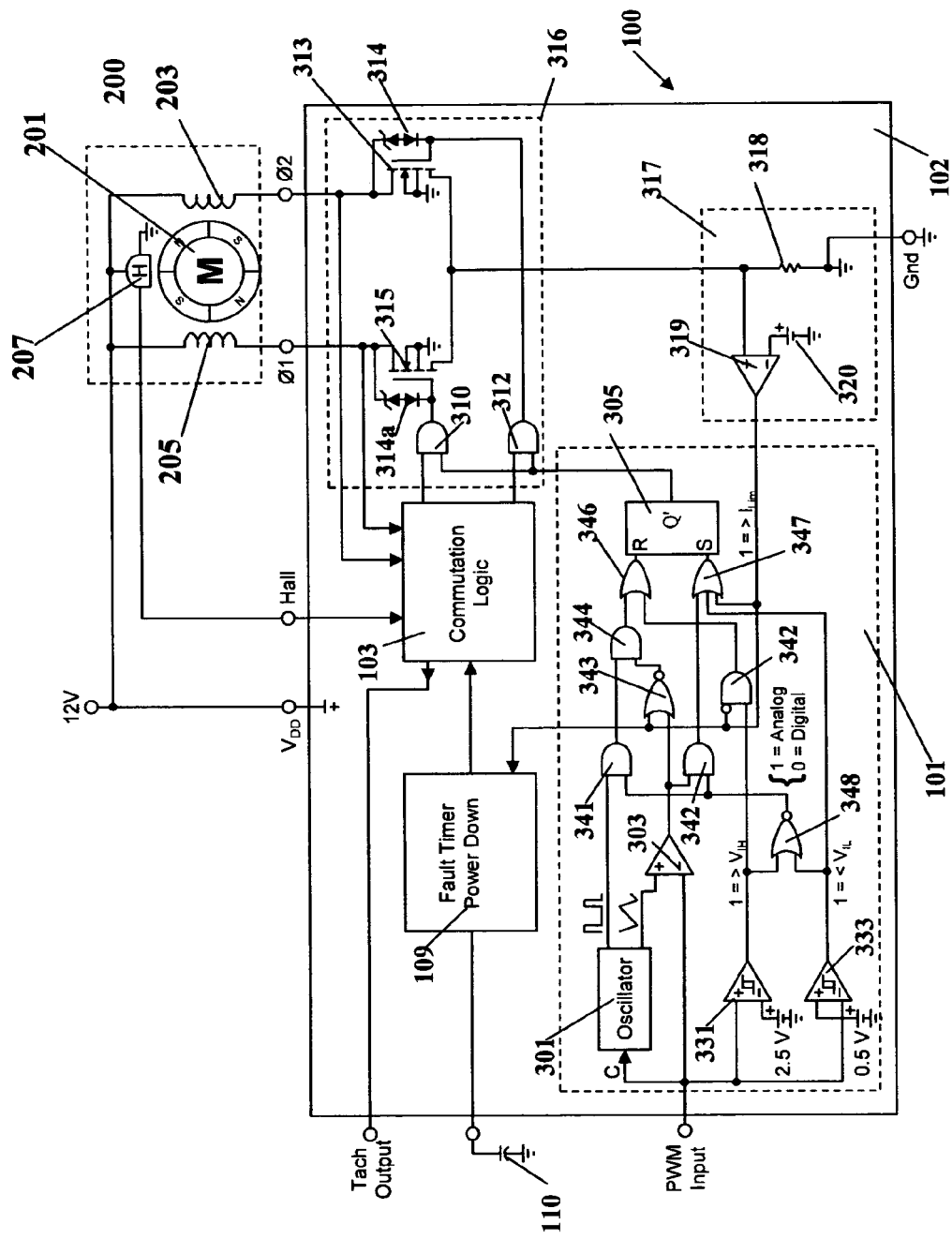
FIG. 3 is a detailed block diagram of the device of FIG. 1.

Controller 100, fully integrated on a single chip 102 contains all required functions for implementing fan speed control. As shown in FIG. 3, pulse width modulator (PWM) 101 comprising a fixed frequency oscillator 301, comparator 303, and a latch 305 along with associated gates for motor speed control of motor 200. Controller 100 also includes commutation logic 103 for proper drive sequencing, on-chip power MOSFETs 313, 315 for direct motor drive, cycle-by-cycle current limiting circuit 317, and a circuit block 319 providing a programmable fault timer with time delayed restart, and a power down low current mode.

Motor 2100 includes rotor 201 and stator windings 203, 205 A rotator position sensor 207 is provided with motor 200. In a typical motor fan arrangement, a Hall effect device sensor is utilized is utilized as sensor 207. Motor 200 includes connections Ø1, Ø2, a sensor output HALL and power connections.

Controller 100 utilizes pulse width modulation to provide an energy efficient means for controlling the motor speed of fan motor 200 by varying the average applied voltage to each stator winding 203, 205 during the commutation sequence.

PWM circuit 101 as noted above includes oscillator 301, comparator 303, and latch 305. Oscillator 301 provides both pulse and saw tooth outputs. PWM circuit 101 is responsive to either an analog or a digital signal on the same input terminal PWM Input.

Figure 4:
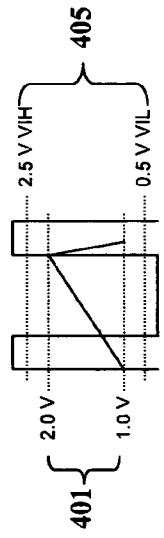
FIG. 4 illustrates input waveforms to the device of FIG. 1.

FIG. 4 illustrates the analog input signal range 401 and a digital input signal range 405 that PWM logic 101 is responsive to in the illustrative embodiment are shown.

PWM circuit 101 includes a sub-circuit comprising level comparators 331, 333 and a NOR gate 348 that is used to determine whether the control signal at terminal PWM Input is a digital control signal. If the control signal is not digital, it is assumed to be analog.

Comparator 331 has an input coupled to terminal PWM Input and compares the voltage at PWM Input against a reference that corresponds to the minimum logic high level. In this embodiment, the minimum logic high voltage level is 2.5 volts. Comparator 331 generates a logic 1 or high output if the voltage at PWM Input exceeds 2.5 volts.

Comparator 333 has an input coupled to terminal PWM Input and compares the voltage at PWM Input against a reference that corresponds to the maximum logic low level. In this embodiment, the maximum logic low voltage level is 0.5 volts. Comparator 333 generates a logic 1 or high output if the voltage at PWM Input is less than 0.5 volts.

Nor gate 348 provides a logic 0 or low output if either, comparator 331 or comparator 333 indicates that the control signal is digital and provides a logic 1 or high output if neither comparator 331 or 333 indicates that the control signal is a digital signal. Operation of gates 341–348 is as follows: AND gate 341 has one input coupled to the square wave output of oscillator 301 and its other input coupled to the output of gate 348. Gate 341 blocks pulses from Oscillator 301 if a digital sign it is present at PWM Input.

This prevents Oscillator 301 from initiating operation of Motor Drive circuit 316 via latch 305 when a digital signal is present at PWM Input.

AND gate 342 has one input coupled to the output of PWM comparator 303 and its other input coupled to the output of gate 348. Gate 342 blocks the PWM comparator output pulses if a digital signal is present at PWM Input. This prevents PWM comparator 303 from terminating operation of Motor Drive circuit 316 via latch 305 when a digital signal is present at PWM Input.

Gate 343 is used to block signals to latch 305 reset input R during the time that current limiter 317 detects that the motor current exceeds a predetermined limit. This prevents PWM comparator 303 from terminating energization of motor drive circuit 316.

Gate 344 allows the pulse output from Oscillator 301 to reset latch 305 if there is no current limiting and no analog input control signal.

Gate 347 is used to lockout the indication that a digital control signal at input PWM Input is in a high state during the time that current limiter circuit 317 detects that the drive current limit is exceeded.

Gate 346 is utilized to reset latch 305 to initiate on-time of motor drive circuit 316. Gate, 347 sets latch 305 to terminate the on-time of motor drive circuit 316.

Figure 5:
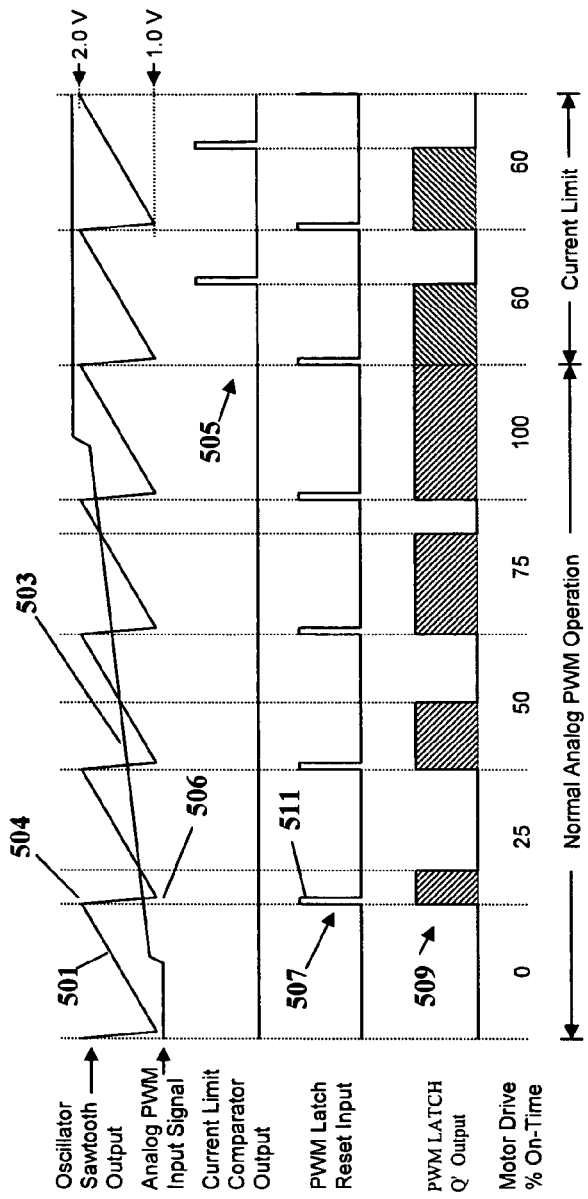
FIGS. 5 and 6 illustrates detailed waveforms.

Operation of PWM circuit 101 in response to analog input control signals may be better understood by referring to the waveforms of FIG. 5. Waveform 501 is the saw tooth output waveform of Oscillator 301. Waveform 503 is the Analog signal control at PWM Input. Waveform 505 is the output of current limit circuit 317. Waveform 507 is the reset input R of PWM latch 305. Waveform 509 is the output Q' of PWM latch 305.

Analog signal input control is accomplished with Oscillator 301 initiating Motor Drive conduction and the PWM Comparator 303 terminating it. As the voltage of saw tooth output waveform 501 falls from its peak level 504 to valley level 506 (2.0 V to 1.0 V, respectively), a pulse 511 is simultaneously generated at the oscillator output 507 to reset PWM Latch 305, thereby causing the output Q' attain a high level allowing conduction of a Motor Drive MOSFET 313, 315. PWM Comparator 303 terminates conduction when saw tooth waveform 501 rises above tie voltage level of the analog control waveform 503 applied to PWM Input. Thus, the conduction duty cycle or average voltage applied to a stator winding 203, 205 of fan motor 200 is directly controlled by the analog voltage at PWM Input. The conduction duty cycle increases from 0% to 100% as illustrated by waveform 509 as PWM Input voltage increases from 1.0 V to 2.0 V, respectively.

Figure 6:
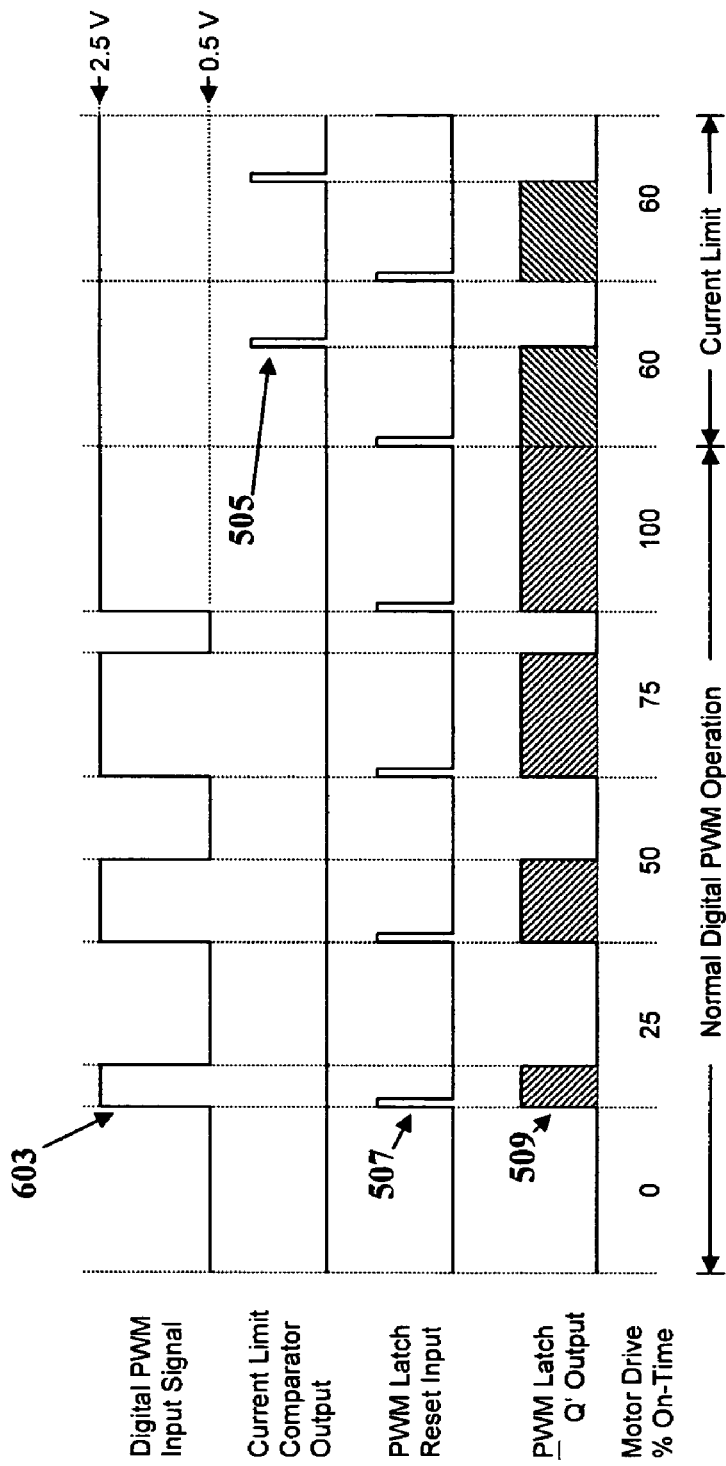

Operation of PWM logic 101 in response to digital control signals at PWM Input may be better understood by referring to the waveforms of FIG. 6. Waveform 603 is a representative waveform of an input digital signal control at PWM Input. Waveform 505 is the output of current limit comparator 317. Waveform 507 is the reset input R of PWM latch 305. Waveform 509 is the output Q' of PWM latch 305.

Digital control is accomplished by applying a digital signal of the desired conduction duty cycle to the PWM Input. As shown in FIG. 4, the low VIL and high VIH states for the digital input encompass the internal saw tooth peak and valley levels. In the illustrative embodiment, saw tooth levels are chosen such that a maximum 0.5 V low state and a minimum 2.5 V high state digital signal is utilized. These levels are easily achievable by 3.0 V logic circuitry.

Latch 305 when reset, initiates conduction of a Motor Drive MOSFET 313, 315. Latch 305 when set, terminates conduction of Motor Drive MOSFETs 313, 315. Thus, the conduction duty cycle is directly controlled by the signal duty cycle present at the PWM Input as long as the signal magnitude is above and below the window detector thresholds provided by comparators 331, 333.

Commutation logic 103 includes a rotor position decoder coupled to HALL input to monitor which in turn is connectable to Hall sensor 207. Rotor position decoder provides proper sequencing of the Phase 1, φ1 and Phase 2, φ2 drive outputs. Hall input is designed to interface directly with an open collector type Hall Effect switch. An internal pull-up is provided to minimize to number of external components. The Commutation Logic provides an output signal for monitoring the motor speed at output Tach.

Direct motor drive is accomplished by providing; two on-chip open drain N-channel MOSFETs 313, 315, each having a high breakdown voltage. The respective MOSFET 313, 315 drains are pinned out to output terminals φ1, φ2 for direct connection to motor windings 203, 205. Zener and series diodes 314, 314a are connected from each respective MOSFET drain to gate to protect the MOSFETs 313, 315 from excessive inductive voltage spikes.

Current limit comparator 317 monitors the voltage drop that appears across a sense resistor 318. If motor 201 becomes overloaded or stalls, the threshold level of current limit circuit 317 will be exceeded causing PWM Latch 305 to set. This terminates conduction of the Motor Drive MOSFETs 313, 315 on an oscillator cycle-by-cycle basis.

The Fault Timer 109 is controlled by the value of the external capacitor 110. A current source included in fault timer 109 is used to charge capacitor 110.

The Fault Time mode is initiated when the current limit circuit 317 is activated. If an over current situation persists for an extended time period, the Fault Timer will gradually discharge the external timing capacitor to a voltage level that will cause the motor to stop and then initiate a restart sequence.

The Power Down mode is initiated by clamping external capacitor 110 to a voltage of 100 mV or less. The drain current for the entirety of integrated circuit 102 will be reduced to less than 10 uA.

Controller 100 advantageously provides the following features:
  Interfaces directly with aSC7512 thermal controller;
  Analog and digital PWM control signal compatibility;
  Motor fault timeout with auto start retry;
  Fan tachometer output for closed loop speed control;
  Latching PWM for enhanced noise immunity;
  Cycle-by-cycle current limit protection;
  On-chip 500 mA motor drivers;
  Low current power down mode;
  Minimum number of external components; and
  8-lead SOIC or MSOP package Controller 100 has many applications, including:
  Personal and notebook computers fans;
  Workstation and mainframe fans;
  LAN server blowers;
  Industrial control system fans;
  Telcom system fans;
  Instrumentation test and measurement fans; and
  Card rack fans.

The invention has been described in conjunction with a specific illustrative embodiment. It will be understood by those skilled in the art that various changes, substitutions and modifications may be made without departing from the spirit or scope of the invention. It is intended that all such changes, substitutions and modifications be included in the scope of the invention. It is not intended that the invention be limited to the illustrative embodiment shown and described herein. It is intended that the invention be limited only by the claims appended hereto, giving the claims the broadest possible scope and coverage permitted under the law.

What is claimed is:

1. A control circuit, comprising:
    a single input terminal for receiving digital signals and analog control signals;
    said digital signals being in a first digital state when below a first level, and being in a second digital state when above a second level;
    said analog signals being within a range that is greater than said first level and less than said second level;
    a comparator circuit coupled to said single input terminal for providing a first output when the level at said single input terminal is below said first level or when the level at said single input terminal is above said second level;
said comparator circuit providing a second output when the level at said single input terminal is between said first level and said second level;
an oscillator, said oscillator providing a pulse waveform at a first output and as saw tooth waveform at a second output;
a pulse width modulated comparator having a first input coupled to said single input terminal and a second input coupled to said oscillate second output and having an output;
a circuit coupled to said comparator, said oscillator first output and to said pulse width modulated comparator output, said circuit operable to generate pulse width modulated control signals in response to digital input signals at said single input terminal and in response to analog input signals at said single input terminal.

2. A control circuit in accordance with claim 1, wherein: said comparator circuit comprises:
a first comparator operable to determine if said level at said single input terminal is below said first level; and
a second comparator operable to determine if said level at said single input terminal is above said second level.

3. A control circuit in accordance with claim 2, comprising:
a logic element coupled to said first comparator and to said second comparator to provide an output indicative of whether said signal at said single input terminal is a digital signal or an analog signal.

4. A control circuit in accordance with claim 1, wherein: said circuit comprises a latch.

5. A method of providing control signals, comprising:
providing a single input terminal;
receiving digital signals at said input terminal, said digital signals being in a first digital state when below a first level, and being in a second digital state when above a second level;
receiving analog signals at said input terminal, said analog signals being within a range that is greater than said first level and less than said second level;
comparing signal levels at said input terminal to said first and said second levels;
providing a first output when the level at said input terminal is below said first level or when the level at said input terminal is above said second level;
providing a second output when the level at said input terminal is between said first level and said second level;
generating pulse width modulated control signals in response to digital input signals at said single input terminal and in response to analog input signals at said single input terminal.

6. A method in accordance with claim 5, comprising:
providing an oscillator, said oscillator providing a pulse waveform at a first output and as saw tooth waveform at a second output;
providing a pulse width modulated comparator having a first input coupled to said single input terminal and a second input coupled to said oscillator second output and having an output;
providing coupled to said comparator, said oscillator first output and to said pulse width modulated comparator output to generate said pulse width modulated control signals when an analog signal is at said single input terminal.

7. A method in accordance with claim 6, comprising:
providing a latch operable in conjunction with said oscillator and said pulse width comparator to generate said pulse width modulated control signals.

8. A motor controller for a brushless direct current motor, comprising:
an input terminal for receiving an analog control signal and a digital control signal;
a control circuit coupled to a single input terminal, said control circuit being responsive to digital input signals and analog input signals at said single input terminal to provide pulse width modulated control signals; and
a motor drive circuit controlled by said control circuit and coupleable to a brushless direct current motor for energizing said motor.

9. A motor controller in accordance with claim 8, comprising:
a single integrated circuit having said control circuit and said motor drive circuit formed thereon.

10. A motor controller in accordance with claim 8, wherein:
said motor drive circuit comprises MOSFETs.

11. A motor controller in accordance with claim 8, comprising:
a current comparator coupled to motor drive circuit for effecting said pulse width modulation control signals on an oscillator cycle-by-cycle basis.

12. A motor controller in accords ace with claim 11, wherein:
said motor drive circuit comprises MOSFETs.

13. A motor controller in accordance with claim 12, wherein:
said current comparator terminates conduction of said MOSFETS on a cycle-by-cycle basis.

14. A motor-controller in accordance with claim 13, comprising:
a single integrated circuit having said control circuit, said motor drive circuit and said current comparator formed thereon.

15. A motor controller in accordance with claim 13, comprising:
commutation logic coupled to said motor drive circuit.

16. A motor controller in accordance with claim 15, wherein:
said commutation logic comprises an input coupleable to a sensor for determining rotor position.

17. A motor controller in accordance with claim 16, comprising:
a single integrated circuit having said control circuit, said motor drive circuit, said current comparator, and said commutation logic formed thereon.

18. A motor controller in accordance with claim 16, comprising:
a circuit comprising a fault timer and a power down circuit coupled to said commutation logic.

19. A motor controller in accordance with claim 18, comprising:
a single integrated circuit having said control circuit, said motor drive circuit, said current comparator, said commutation logic, and said circuit comprising said fault timer and power down circuit formed thereon.

20. A motor controller in accordance with claim 8, wherein:
said digital signals being in a first digital state when below a first level, and being in a second digital state when above a second level;
said analog signals being within a range that is greater than said first level and less than said second level; and
said control circuit comprises a comparator circuit coupled to said single input terminal for providing a first output when the level at said single input terminal is below said first level or when the level at said single input terminal is above said second level; said comparator circuit providing a second output when the level at said single input terminal is between said first level and said second level, and
whereby said first output indicates that a signal at said single input terminal is a digital signal and said second output indicates that a signal at said single input terminal is an analog signal.

21. A motor controller in accordance with claim 20, wherein;
said control circuit comprises:
an oscillator, said oscillator providing a pulse waveform at a first output and as saw tooth waveform at a second output;
a pulse width modulated comparator having a first input coupled to said single input terminal and a second input coupled to said oscillator second output and having an output and a circuit coupled to said comparator, said oscillator first output and to said pulse width modulated comparator output, said circuit operable to generate pulse width modulated control signals in response to digital input signals at said single input terminal and in response to analog input signals at said single input terminal.

22. A motor controller in accordance with claim 21, comprising:
a single integrated circuit having said motor controller formed thereon.

23. A PWM controller, comprising:
a single input terminal for receiving an analog control signal and a digital control signal;
a control circuit coupled to said single input terminal, said control circuit being responsive to digital input signals and to analog input signals at said single input terminal to provide pulse width modulated control signals; and
a circuit controlled by said control circuit.

24. A PWM controller in accordance with claim 23, comprising:
a single integrated circuit having said control circuit and said circuit controlled by said control circuit formed thereon.

25. A PWM controller in accordance with claim 23, wherein:
said digital signals being in a first digital state when below a first level, and being in a second digital state when above a second level;
said analog signals being within a range that is greater than said first level and less than said second level; and
said control circuit comprises a comparator circuit coupled to said single input terminal for providing a first output when the level at said single input terminal is below said first level or when the level at said single input terminal is above said second level: said comparator circuit providing a second output when the level at said single input terminal is between said first level and said second level, and
whereby said first output indicates that a signal at said single input terminal is a digital signal and said second output indicates that a signal at said single input terminal is an analog signal.

26. A PWM controller in accordance with claim 25, wherein;
said control circuit comprises:
all oscillator, said oscillator providing a pulse waveform at a first output and as saw tooth waveform at a second output;
a pulse width modulated comparator having a first input coupled to said single input terminal and a second input coupled to said oscillator second output and having an output; and
a circuit coupled to said comparator, said oscillator first output and to said pulse width modulated comparator output, said circuit operable to generate pulse width modulated control signals in response to digital input signals at said single input terminal and in response to analog input signals at said single input terminal.

27. A PWM controller in accordance with claim 26, comprising:
a single integrated circuit having said PWM controller formed thereon.

* * * * *